Oct. 20, 1959  J. A. CULBERTSON  2,909,245
DISC TYPE BRAKE
Filed Feb. 23, 1956  2 Sheets-Sheet 1

INVENTOR.
JAMES A. CULBERTSON
BY
R. L. Miller
ATTORNEY

Oct. 20, 1959 J. A. CULBERTSON 2,909,245
DISC TYPE BRAKE
Filed Feb. 23, 1956 2 Sheets-Sheet 2

INVENTOR.
JAMES A. CULBERTSON
BY
R. L. Miller
ATTORNEY

United States Patent Office 2,909,245
Patented Oct. 20, 1959

2,909,245

DISC TYPE BRAKE

James A. Culbertson, Barberton, Ohio, assignor to The Goodyear Tire & Rubber Company, Akron, Ohio, a corporation of Ohio Application February 23, 1956, Serial No. 567,365

3 Claims. (Cl. 188—72)

This invention relates to disc-type brakes, and especially to a brake of such type wherein the brake pressure plate is particularly resistant to any dishing or curving movement upon braking action, or when the brake is released.

It is the general object of the present invention to provide a disc-type brake, which is characterized by the retension of the brake pressure plate in a substantially planar, or flat condition when operated.

Another object of the invention is to provide resilient means in a brake of the type referred to wherein such resilient means both resists dishing movement of the brake pressure plate and also provides clearance for the pressure plate when the brake is released.

One of the objects of the present invention is to set up tensional forces on the axially inner surface of a brake pressure plate when the brake is in its released inoperative condition.

A further object of the invention is to provide pin means on the radially outermost portions of a brake pressure plate and to secure such pin means resiliently to a brake housing for resiliently positioning the brake pressure plate against dishing movement inwardly at the edge portions of the pressure plate.

The foregoing and other objects and advantages of the invention will be made more apparent as the specification proceeds.

In the accompanying drawings.

Figure 1:
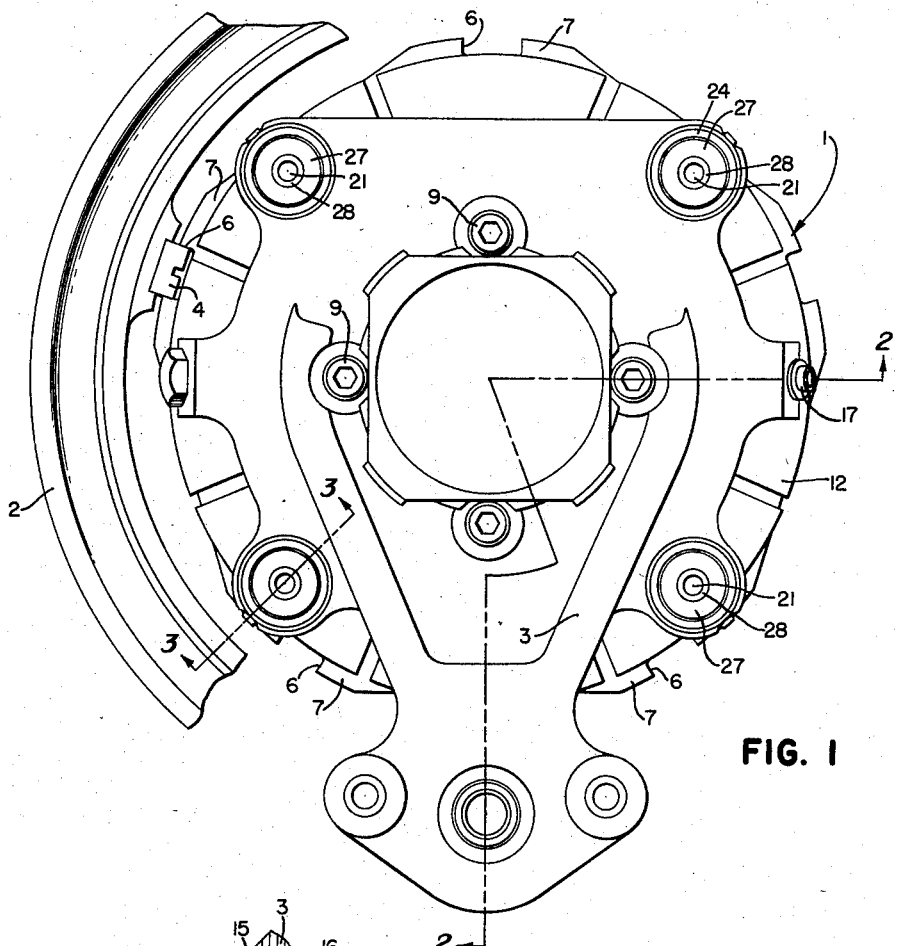
Fig. 1 is a side elevation of a brake and wheel assembly wherein the brake embodies the principles of the invention.

The present invention broadly relates to a brake having a brake disc and means for effecting braking action wherein the combination comprises a brake pressure plate adapted to be engaged by the braking action means to be forced thereby against the brake disc for brake action, pin means engaging and carried by the brake pressure plate, and means resiliently securing the pin means to another portion of the brake, such as a brake housing, to resist dishing movement of the brake pressure plate towards the brake disc on brake action, or when the brake is released.

Attention now is particularly directed to the details of the structure shown in the accompanying drawings, wherein a brake is indicated as a whole by the numeral 1. The brake is shown in combination with a wheel 2 of conventional construction, and a brake housing 3 is provided in the combination. The wheel 2 has a plurality of keys 4 secured thereto at spaced portions of its circumference as by means of cap screws 5. These keys 4 engage slots 6 provided in peripheral portions of brake rotor discs 7, a plurality of which are shown in this embodiment of the invention. Hence the brake discs 7 are adapted to rotate with the wheel 2 but are movable axially thereof as hereinafter described. The brake housing 3 has a hub 8 secured thereto by bolts 9 which also secure a stop, or back plate 10 at an axial end portion of the brake 1. A plurality of brake stator discs 11 are alternately positioned with respect to the rotor discs 7, and an end pressure plate 12 is provided at the axial end portion of the assembly of brake discs, as shown in the drawings. All of the stator discs 11 and pressure plate 12 are splined to the hub 8 but are movable axially of the brake 1 for braking action as will be understood.

Figure 2:
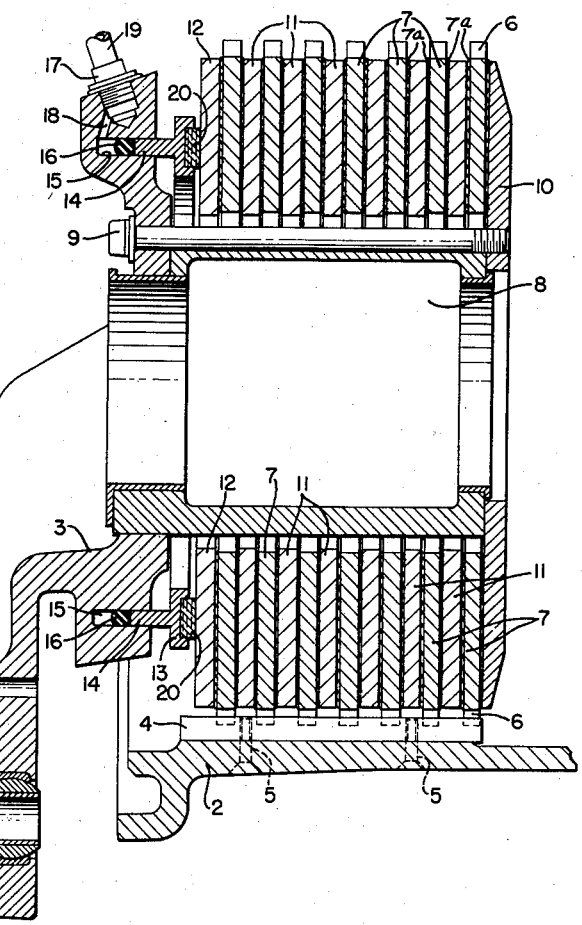
Fig. 2 is a fragmentary vertical section taken on line 2—2 of Fig. 1 and showing the brake parts in brake applied position.

An annular ring 13 is positioned adjacent the face of the pressure plate 12 and it is slidably carried by the brake housing 3 by means of a sleeve-like piston 14 slidably received in a cylinder 15 provided in the brake housing 3. A conventional means, such as an O-ring, or other sealing ring 16 is provided at the end of the piston 14 to seal such piston in the cylinder 15. Thus hydraulic fluid can be supplied to the cylinder 15, as by means of a fitting 17, connecting to a bore 18 provided in the brake housing and which fitting connects to a conduit 19 that extends to a conventional braking source of hydraulic pressure fluid, such as a master operating cylinder of a hydraulic brake system so that fluid under pressure can be supplied to the cylinder 15 for effecting braking movement of the ring 13. This movement of the ring 13 is directed axially toward the brake 1 and moves any suitable pressure-distributing contact member 20 carried by the ring 13 into engagement with the pressure plate 12 which in turn moves axially in the brake to force the brake discs 7 and 11 into tight frictional engagement with each other for the desired braking action. The brake is shown in brake applied position in Fig. 2.

As an important feature of the invention, the pressure plate 12 is provided with a plurality of members at circumferentially-spaced radially outer portions thereof to hold such edge portions of the pressure plate against any substantial "dishing" particularly upon brake release. Such pressure or retention member each includes a pin 21 having a head 22 that is suitably engaged with the pressure plate 12. The pin 21 extends axially of the brake and protrudes through an aligned bore in the brake housing 3. The pin 21 is engaged with the brake housing 3 by means of a cup 23 received in the bore in the brake housing and with the cup 23 having a flange 24 on its end engaging the brake housing. The closed end 25 of the cup is centrally apertured to slidably receive the pin 21. The retainer pin is resiliently engaged with the cup 23 by one or more coil springs 26 which encompass the retainer pin 21 and have end portions thereof engaging the end 25 of the cup. The coil spring or springs 26 provided in the apparatus engage a washer 27 releasably secured to the end of the retainer pin 21, as by a split lock ring 28. This lock ring 28 preferably has a conical outer surface and the inner surface of the washer 27 is shaped complementary to the outer conical shape of the lock ring so that these members will snugly engage each other by the action of the springs 26 between the washer 27 and end 25 of the cup 23. The washer 27 preferably has a guide sleeve 29 formed therewith and extending therefrom for snugly engaging the pin 21 adjacent the washer 27 and aiding in positioning the coil springs 26 in the assembly.

The elements can be readily assembled by compressing the springs 26 by pressure applied to the washer 27 to expose the end of pin 21, whereupon the split locking ring 28 can be snapped into engagement with the end of the retainer pin 21, by engaging an annular groove 30 provided therein. Releasing the washer 27 will then permit the adjacent surfaces of the washer 27 and lock ring 28 to be forced into engagement with each other by the springs 26. The pin 21 may be fixedly engaged with the pressure plate 12, if desired.

Figure 3:
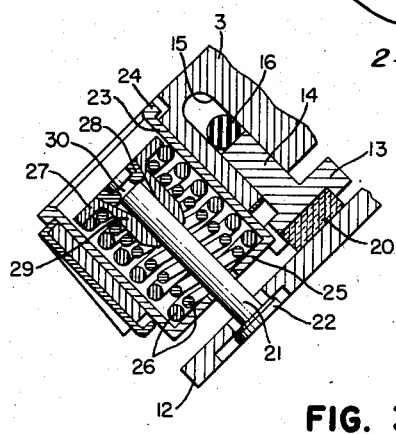
Fig. 3 is an enlarged detail section taken on line 3—3 of Fig. 1 with the parts in brake on position.

It will be understood that other retainer units like that of Fig. 3 are provided at equally spaced circumferential portions of the brake 1, as shown in Fig. 1, for exerting the desired resilient force upon the brake pressure plate 12. Such units, as clearly shown in the drawings, are all positioned radially beyond the annular ring 13 and associated means.

These spring units provided in engagement with the pressure plate 12 function to remove all pressure between rotor discs 7 and stator discs 11 when no braking force is applied to piston 14. However, when braking pressure is applied to piston 14, the forces exerted by the springs 26 on the retainer pins 21 and pressure plate 12 will be increased as such braking movement forces the brake pressure plate 12 axially to compress the discs. Thus increased resistance is set up by the coil springs to any inward dishing movement of the peripheral portion of the brake pressure plate 12 and the springs 26 will act to prevent any inward dishing of the plate when the brake 1 is actuated and the axially inner face of the brake pressure plate 12 is heated. When the brake is released, the compressive energy stored in the springs 26 will move the brake pressure plate 12 to its released position at which time operative clearance is provided between the associated brake discs 7 and 11 for free, unbraked operating use of the wheel assembly. Upon brake release, the ring 13 engages with the housing 3 and pressure plate 12 is resiliently held at its periphery by the springs 26 to substantially prevent inward dishing toward the brake discs of the periphery of the brake pressure plate, as it cools. The ring 13 engaging the housing 3 serves as a fulcrum during this action with plate 12 abutting against contact member 20 under the force of springs 26. It will be understood that the resilient force of the springs 26 in brake-off position is still very considerable on the plate 12 to restrict its dishing movement.

In view of the foregoing, a brake construction has been provided wherein any dishing or bending of the brake pressure plate is restricted and desired operative clearance is continually provided in the brake when released. The brake also has an equalized distribution of braking forces in the brake when operated.

Figure 4:
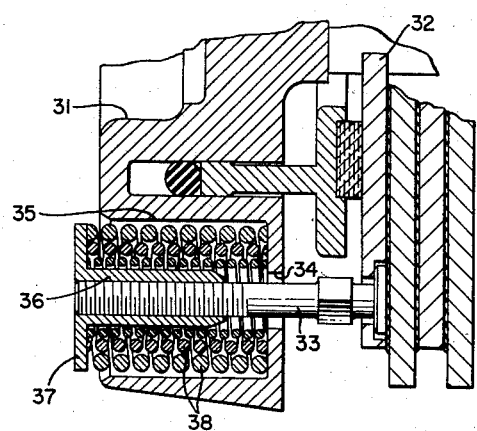
Fig. 4 is a fragmentary section, like Fig. 3, of a modified embodiment of a brake of the invention.

A different and somewhat simplified embodiment of the brake is shown in Fig. 4 of the drawings. A brake housing 31 is provided that has a brake pressure plate 32 positioned in association therewith. This brake pressure plate 32 is actuated by the same general type of means as described in relation to Figs. 1 to 3 of the drawings and with such brake being of the same general construction throughout as the other brake heretofore described in detail. Such brake pressure plate 32 has a retainer pin 33 extending perpendicularly therefrom. In this instance, the retainer pin 33 extends through a hole 34 provided in the base portion of a recess 35 formed in the brake housing 31. The end of the retainer pin 33 preferably is threaded and has a sleeve 36 adjustably secured thereto, which sleeve has an end flange 37 provided thereon. One or more resilient coil springs 38, or similar members, are provided in compression engagement between the flange 37 and the base portion of the recess 35 for urging the retainer pin 33 axially outwardly of the brake housing 31. Use of one or more of a plurality of the springs 38 and adjustability of sleeve 36 permits ready adjustment of the total compressive forces set up thereby. With brake wear, the position of the threaded sleeve 36 can readily be varied to move flange 37 along the axis of the retainer pin 33 to adjust the released or no load position of the brake pressure plate 32 as wear in the brake discs in the structure occurs. The adjustment also permits convenient change in the pressures set upon the brake pressure plate 32 by the springs 38. Such adjustment can readily be made manually at periodic inspections of the brake means.

The embodiment of the invention shown in Fig. 4 operates in the same manner as that shown in Fig. 3 and heretofore described.

It should be understood that any conventional type of brake linings, blocks or plates can be used in the brakes of the invention. Such brake means are normally in the form of a sintered-on coating 7a which is bonded to the brake discs 7.

From the foregoing, it is seen that an improved type of a brake has been provided, which brake has means therein for preventing inward dishing of the brake pressure plate and clearance is provided in the brake when released.

While a certain representative embodiment and details have been shown for the purpose of illustrating the invention, it will be apparent to those skilled in this art that various changes and modifications may be made therein without departing from the spirit or scope of the invention.

What is claimed is:

1. A brake assembly comprising an axle, a housing secured thereto, a hub fixed to said housing, a plurality of stator discs keyed to said hub for axial non-rotative movement, a wheel rotatably mounted on said axle, a plurality of rotor discs keyed to said wheel for axial movement, said rotor and said stator discs being in interrelated arrangement, a backing plate secured to one end of the hub, an annular pressure plate keyed to said hub for axial movement at the opposite end of the hub with the stator and rotor discs between said pressure plate and said backing plate, said pressure plate having an axial thickness about equal to the axial thickness of each stator and rotor disc, an annular piston slidably received in an annular cylinder of said housing, said piston having a radially narrow face engaging only a radially narrow medial zone of said pressure plate, a plurality of axially extending pins secured to said pressure plate at equally spaced positions thereabout at the outer periphery thereof radially beyond said piston, and spring means on said housing engaging the end of each pin and having sufficient strength to urge the pressure plate to a released position and also provide a force acting axially at the periphery of the pressure plate with the radially narrow face of the annular piston as a fulcrum to prevent dishing of the pressure plate.

2. A brake assembly comprising an axle, a housing secured thereto, a hub fixed to said housing, a plurality of stator discs splined to said hub for axial non-rotative movement, a wheel rotatably mounted on said axle, a plurality of rotor disc splined to said wheel for axial movement, said rotor and said stator discs being in interrelated arrangement, a backing plate secured to one end of the hub, an annular pressure plate keyed to said hub for axial movement at the opposite end of the hub with the stator and rotor discs between said pressure plate and said backing plate, said pressure plate having an axial thickness about equal to the axial thickness of each stator and rotor disc, an annular piston slidably received in an annular cylinder of said housing, said piston having a radially narrow face engaging only a radially narrow medial zone of said pressure plate, a plurality of axially extending pins secured to said pressure plate at equally spaced positions thereabout at the outer periphery thereof radially beyond said piston, and spring means on said housing engaging the end of each pin and having sufficient strength to urge the pressure plate to a released position and also provide a force acting axially at the periphery of the pressure plate with the radially narrow face of the annular piston as a fulcrum to prevent dishing of the pressure plate, said spring means comprising helical springs about each pin and seated in sockets of said housing.

3. A brake assembly comprising an axle, a housing secured thereto, a hub fixed to said housing, a plurality of stator discs keyed to said hub for axial non-rotative movement, a wheel rotatably mounted on said axle, a plurality of rotor discs keyed to said wheel for axial movement, said rotor and said stator discs being in interrelated arrangement, a backing plate secured to one end of the hub, an annular pressure plate keyed to said sub for axial movement at the opposite end of the hub with the stator and rotor discs between said pressure plate and said backing plate, annularly positioned piston means carried by said housing, said piston means having a radially narrow face engaging only a radially narrow medial zone of said pressure plate, a plurality of axially extending pins secured to said pressure plate at equally spaced positions thereabout at the outer periphery thereof radially beyond said piston means, and spring means on said housing engaging the end of each pin and having sufficient strength to urge the pressure plate to a released position and also provide a force acting axially at the periphery of the pressure plate with the radially narrow face of the piston means acting as a fulcrum to prevent dishing of the pressure plate.

References Cited in the file of this patent

UNITED STATES PATENTS

| | | |
|---|---|---|
| 899,919 | St. Clair | Sept. 29, 1908 |
| 2,207,431 | Burns | July 9, 1940 |
| 2,405,219 | Lambert | Aug. 6, 1946 |
| 2,437,670 | Adamson | Mar. 16, 1948 |

FOREIGN PATENTS

| | | |
|---|---|---|
| 648,819 | Great Britain | Jan. 10, 1951 |